March 25, 1952     F. S. BEELER     2,590,369
BAIT CASTING REEL
Filed April 24, 1948
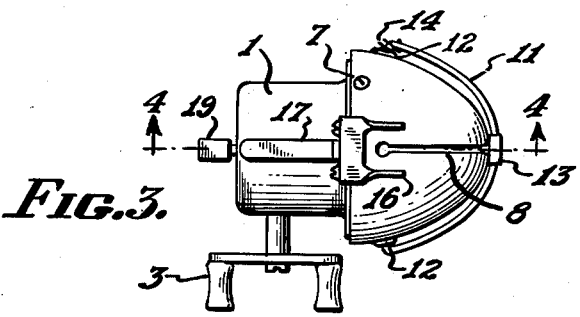
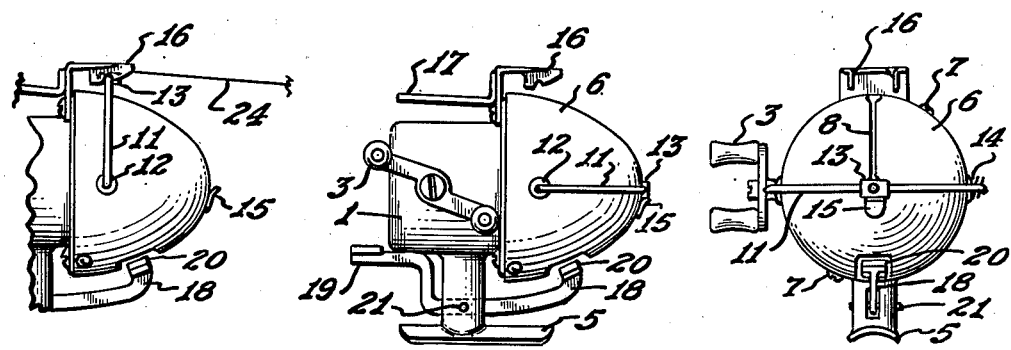
FIG.5.     FIG.1.     FIG.2.
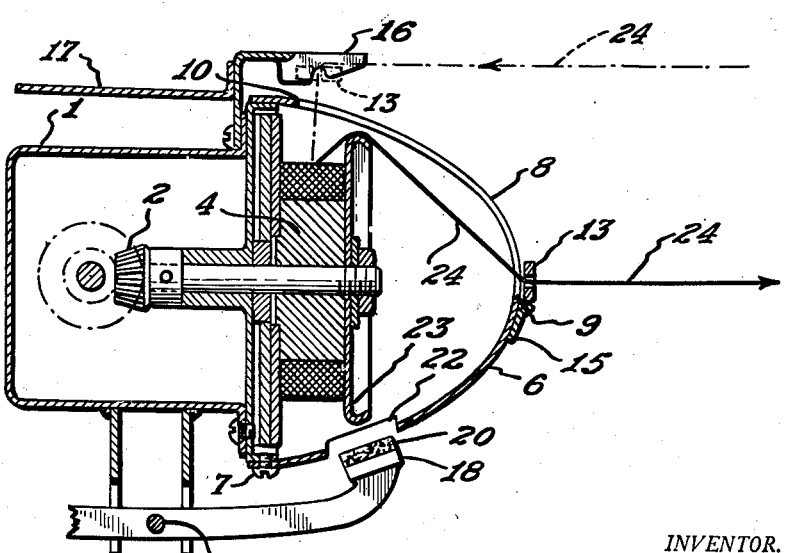
FIG.4.
INVENTOR.
FRANCIS S. BEELER.
BY
Allen & Allen
ATTORNEYS.

Patented Mar. 25, 1952

2,590,369

UNITED STATES PATENT OFFICE 2,590,369

BAIT CASTING REEL

Francis S. Beeler, Hamilton, Ohio

Application April 24, 1948, Serial No. 23,034

4 Claims. (Cl. 242—84.5)

My invention relates to a bait casting reel of the type used in projecting an artificial lure or bait in fishing.

The bait casting reel which is the subject matter of this invention is of the type where the line carrying spool is positioned on the rod with the axis of the spool parallel to the rod and wherein the fishing line slips over the flange of the spool in casting. The spool itself is usually stationary and hence there is no drag on the line created by the spinning of a spool, nor is there a possibility of backlash created by the inertia of the spool.

While casting reels of the above type are old in the art, I have found that they usually have at least one objectionable feature. If the lure or bait is heavy and if the cast is any appreciable distance, the line as it slips over the flange of the reel tends to form a revolving loop which creates friction at the first line guide on the rod and shortens the length of the cast. This action is greatly increased as the weight of the line is increased due to the centrifugal force created.

It is an object of my invention is to provide a bait casting reel of the slip cast type where the looping of the line as it leaves the reel is greatly reduced, confined or broken up entirely, thus reducing the friction and permitting a longer cast with relatively heavy fishing line.

It is a further object of my invention to provide a bait casting reel as described above which is almost entirely enclosed, thus preventing the line from becoming entangled with any branches, bushes, etc., near the hand of the caster.

It is a further object of my invention to provide a bait casting reel which while it has all the advantages of a slip cast reel, also has the advantages of the normal type of reel, such as permitting the easy reeling in of the line, pulling out of the line, and other needed control by means of the reel handles as in the ordinary fishing reel.

A further object of my invention is to provide a positive brake which may be either used to check the line when casting, or may be used to control the spinning of the spool when reeling in or playing the fish.

It is a further object of my invention to provide a bait casting reel having all of the advantages of the above which is rugged in construction, simple to maintain, and relatively inexpensive to manufacture and which may be easily repaired and adjusted with a minimum of tools.

These and other objects of my invention which will be set forth hereinafter or will be apparent to one skilled in the art upon reading these specifications, I accomplish by that certain construction and arrangement of parts of which I shall now describe an exemplary embodiment. Reference is now made to the drawings which form a part hereof and in which:

Figure 1 is a side elevation of my novel bait casting reel.

Figure 2 is a front elevation of my novel bait casting reel.

Figure 3 is a plan view of my reel.

Figure 4 is a cross section of my novel reel taken on the section line 4—4 of Figure 3.

Figure 5 is a side elevation of a portion of my bait casting reel with the line control in reeling in position.

Briefly, in the practice of my invention, I provide a fish line carrying spool which is mounted with its axis parallel to the rod so that the line may easily and freely slip over the spool flange. Surrounding and enclosing the spool, I provide a shell having a slot, one terminal of which is aligned with the axis of the spool, while the other terminal of the slot is aligned normal to the spool core. The line runs through the slot and through a grommet mounted on a bail hinged on the shell.

In casting, the line carrying grommet is positioned in axial alignment with the spool and the spool itself remains stationary. The line slips over the flange of the spool and any looping or centrifugal action created is confined to the shell and broken up by the shell and bail.

In reeling in the line, the grommet carrying the line is shifted to the other end of the slot and held there, and the spool is rotated by the usual reeling handles, thus taking up on the line and placing it on the spool.

A brake is also provided which has a shoe which may be made to abut the flange of the spool, thus checking the line, while casting or slowing down and braking the rotation of the spool when reeling in the line.

Referring to the drawing, I provide a housing 1 containing gearing 2 actuated by the handles 3 so as to rotate the spool 4. The gearing 2 may be any ratio desirable and a check or "clicker" may be incorporated into the mechanism, if preferred.

The housing 1 is mounted on the usual base 5 which is adapted to be held to a fishing rod by the usual reel clamps.

It is to be noted that the spool 4, has its axis aligned with the line guides and parallel to the rod.

A shell or housing 6 completely encloses the spool 4 and is preferably mounted on the housing 1 by screws 7.

I provide a slot 8, one end 9 of which is aligned with the axle of the spool 4 and the other end 10 is normal to the core of the spool 4.

A bail 11 is hinged at 12 to the shell 6. There is a line passing grommet 13 mounted on the bail 11 so that it will ride up and down the slot 8.

I preferably provide a spring 14 which urges the bail 11 into the position shown in Figure 1 for casting, and I may employ an abutment 15 for holding the grommet 13 in alignment with the axle of the spool 4.

At the upper portion of the shell 6, I provide a latch 16 which holds the bail 11 in its upward position with the grommet 13 normal to the core of the spool 4, (see Figure 5). This is the reeling in position. The latch 16 is actuated by a thumb lever 17. While I have shown the latch 16 and the terminal of the slot 8 on the upper portion of the shell 6, it is to be understood that it is within the contemplation of my invention to place the terminal of the slot anywhere around the circle of the shell 6 just so that it is normal to the core of the spool 4 and will permit easy reeling in onto the spool 4.

In order to brake my reeling, I provide a lever 18 actuated by a thumb lever 19. The braking end may carry a leather brake shoe 20 and is pivoted at 21. From the above, it is apparent that when the lever 19 is depressed the leather brake shoe 20 travels through an aperture 22 in the shell 6 and abuts the flange 23 so as to prevent the line 24 from slipping over the flange 23 or if the spool 4 is being rotated to act as a brake on the same.

In operation, my novel bait casting reel is handled somewhat as follows: The caster presses the thumb lever 19 which forces the shoe 20 against the flange 23 of the spool 4. This prevents the line 24 from slipping off the flange 23 and gives a base for a cast. As the cast is made, the thumb lever 19 is released which permits the line 24 to slip off the spool 4 over the flange 23. The dome or hemispherical shaped shell 6 and the bail break up any looping as the line comes off around the flange 23. If it is desirable to stop the cast in midair the brake may again be applied, which will check the cast at once.

After the cast has been made, the bail 11 is pulled up until it is latched by latch 16 (see Figure 5). In this position, the actuation of the reel handles 3 will rotate the spool 4 and wind in the line 24. As heretofore stated, it may be desirable to incorporate a clicker as a drag in the winding mechanism or any other braking means. The fish is played and brought in with the bail in the position shown in Figure 5. It should be noted that the latch 16 firmly holds the bail 11 in the position shown in Figure 5 until released by depressing the lever 17 whereupon the spring 14 brings the bail 11 back to the position shown in Figures 1 and 4.

The shell 6, while acting to break up any looping also prevents the line on the spool 4 from becoming entangled with branches or the like.

The shell 6 need not be imperforate, but can be in the form of a basket or the like. In fact, if the shell 6 were eliminated, the bail 11 would form a basket and break up any looping of the line.

The reel may be easily taken apart by removing the shell 6 after the screws 7 have been taken out.

From the above, it is apparent that I have provided a slip cast reel which may be used with relatively heavy fishing line, but which will not loop up as the line comes off the reel and act as a drag on the cast. It is also apparent that I have provided a sure and substantial manner of holding the line while it is being reeled in and provided a shell which also protects the line on the spool.

It is to be understood that modifications may be made in my invention without departing from the spirit thereof, and I do not intend to limit myself otherwise than as pointed out in the claims which follow.

Having thus described my invention, what I claim as new and desire to secure by Letters Patent is:

1. A bait casting reel comprising a line carrying spool having a flange over which the line is adapted to slip in casting, a shell enclosing said spool and having a line passing slot therein, one terminal of which is in axial alignment with said spool and the other terminal aligned normal to the spool core and means adapted to selectively confine a fishing line passing through said slot to one terminal or the other, and means for rotating the spool, said line confining means comprising a bail pivoted to said shell and having a line passing grommet therein positioned to ride along said slot and a releasable latch for holding said bail with the grommet normal to the spool core and a spring urging said bail to the other end of said slot.

2. A bait casting reel comprising a line carrying spool having a flange over which the line is adapted to slip in casting, a shell enclosing said spool and having a line passing slot therein, one terminal of which is in axial alignment with said spool and the other terminal aligned normal to the spool core and means adapted to selectively confine a fishing line passing through said slot to one terminal or the other, and means for rotating the spool, said line confining means comprising a bail pivoted to said shell and having a line passing grommet therein positioned to ride along said slot and a releasable latch for holding said bail with the grommet normal to the spool core and a spring urging said bail to the other end of said slot, and a brake comprising a member selectively abuttable against said spool flange.

3. A bait casting reel comprising a line carrying spool having a flange over which the line is adapted to slip in casting, a shell enclosing said spool and having a line passing slot therein, one terminal of which is in axial alignment with said spool and the other terminal aligned normal to the spool core and means adapted to selectively confine a fishing line passing through said slot to one terminal or the other, and means for rotating the spool, said line confining means comprising a bail pivoted to said shell and having a line passing grommet therein positioned to ride along said slot and a releasable latch for holding said bail with the grommet normal to the spool core and a spring urging said bail to the other end of said slot, and a brake comprising a member selectively abuttable against said spool flange, and manually actuated by a member outside of said shell.

4. A bait casting reel comprising a line carrying spool having a flange over which the line is adapted to slip in casting, a shell enclosing said spool and having a line passing slot therein, one terminal of which is in axial alignment with said spool and the other terminal aligned normal to the spool core and means adapted to selectively confine a fishing line passing through said slot to one terminal or the other, and means for rotating the spool, said line confining means comprising a bail pivoted to said shell and having a line passing grommet therein positioned to ride along said slot and a releasable latch for holding said bail with the grommet normal to the spool core and a spring urging said bail to the other end of said slot, and a brake comprising a member selectively abuttable against said spool flange, and manually actuated by a member outside of said shell, said shell being substantially hemispherical in configuration with the slot running from the pole to the equator.

FRANCIS S. BEELER.

REFERENCES CITED

The following references are of record in the file of this patent:

UNITED STATES PATENTS

| Number | Name | Date |
|---|---|---|
| 161,314 | Winans et al. | Mar. 23, 1875 |
| 1,625,988 | Dice | Apr. 26, 1927 |
| 2,179,413 | Kolosso | Nov. 7, 1939 |

FOREIGN PATENTS

| Number | Country | Date |
|---|---|---|
| 8,517 | Great Britain | of 1910 |